United States Patent
Leugemors et al.

(10) Patent No.: US 9,016,377 B2
(45) Date of Patent: *Apr. 28, 2015

(54) USE OF A CHOPPER MECHANISM TO ADD FIBERS TO A WELL

(71) Applicant: Schlumberger Technology Corporation, Sugar Land, TX (US)

(72) Inventors: Edward Leugemors, Needville, TX (US); Raafat Abbas, St. John's, CA (US); Erik Rhein-Knudsen, La Baule (FR); William R. Mcintire, Sugar Land, TX (US); Jean-Louis Pessin, Amiens (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,702

(22) Filed: Dec. 4, 2012

(65) Prior Publication Data
US 2013/0092377 A1   Apr. 18, 2013

Related U.S. Application Data

(63) Continuation of application No. 11/696,999, filed on Apr. 5, 2007, now Pat. No. 8,322,424.

(51) Int. Cl.
| | |
|---|---|
| E21B 43/02 | (2006.01) |
| E21B 43/16 | (2006.01) |
| E21B 41/00 | (2006.01) |

(Continued)

(52) U.S. Cl.
CPC ... *C09K 8/00* (2013.01); *C09K 8/92* (2013.01); *E21B 43/267* (2013.01); *C09K 8/032* (2013.01); *E21B 21/062* (2013.01); *E21B 43/26* (2013.01);

(Continued)

(58) Field of Classification Search
None
See application file for complete search history.

(56) References Cited

U.S. PATENT DOCUMENTS

| | | | | |
|---|---|---|---|---|
| 2,952,318 | A | 9/1960 | Ritch | |
| 3,099,047 | A * | 7/1963 | Morrill | ............................ 19/81 |

(Continued)

FOREIGN PATENT DOCUMENTS

| | | |
|---|---|---|
| GB | 1519884 A | 8/1978 |
| RU | 2042781 C1 | 8/1995 |

(Continued)

OTHER PUBLICATIONS

International Search Report and Written Opinion of PCT Application Serial No. PCT/IB2008/051081 dated Jan. 16, 2009 (8 pages).

(Continued)

*Primary Examiner* — Angela M DiTrani
(74) *Attorney, Agent, or Firm* — Jeffrey R. Anderson; Rachel E. Greene; Myron K. Stout

(57) ABSTRACT

A chopper mechanism for providing a fiber to a fluid at an oilfield. The chopper mechanism may be employed to process the fiber from an uncut form to a cut form in order to provide a mixture of the fluid and the fiber with flowback inhibiting character. Techniques of employing the chopper mechanism may be utilized at the site of an oilfield for applications such as fracturing, cementing, and drilling. Additionally, the chopper mechanism itself may be made available as a large high capacity chopper assembly, or a smaller handheld chopper gun for slower rate fiber supply operations.

13 Claims, 6 Drawing Sheets

(51) Int. Cl.
   *C09K 8/92*      (2006.01)
   *C09K 8/00*      (2006.01)
   *E21B 43/267*    (2006.01)
   *C09K 8/03*      (2006.01)
   *E21B 21/06*     (2006.01)
   *E21B 43/26*     (2006.01)
   *C09K 8/42*      (2006.01)
   *E21B 33/13*     (2006.01)

(52) U.S. Cl.
   CPC ............... *C09K 8/42* (2013.01); *C09K 2208/08* (2013.01); *E21B 33/13* (2013.01)

(56) References Cited

U.S. PATENT DOCUMENTS

| | | |
|---|---|---|
| 3,593,798 A | 7/1971 | Darley |
| 3,854,533 A | 12/1974 | Gurley et al. |
| 3,891,565 A | 6/1975 | Colpoys |
| 3,973,627 A | 8/1976 | Hardy et al. |
| 4,109,721 A | 8/1978 | Slusser |
| 4,390,371 A | 6/1983 | Cornwell |
| 4,527,627 A | 7/1985 | Graham et al. |
| 4,623,021 A | 11/1986 | Stowe |
| 4,665,988 A | 5/1987 | Murphey et al. |
| 4,708,206 A | 11/1987 | Jennings |
| 4,875,525 A | 10/1989 | Mana |
| 5,222,558 A | 6/1993 | Montgomery et al. |
| 5,251,697 A | 10/1993 | Shuler |
| 5,330,005 A | 7/1994 | Card et al. |
| 5,381,864 A | 1/1995 | Nguyen et al. |
| 5,439,055 A | 8/1995 | Card et al. |
| 5,501,275 A | 3/1996 | Card et al. |
| 5,582,249 A | 12/1996 | Caveny et al. |
| 5,667,012 A * | 9/1997 | Hoover et al. ............ 166/308.1 |
| 6,045,070 A | 4/2000 | Davenport |
| 6,725,930 B2 | 4/2004 | Boney et al. |
| 8,322,424 B2 * | 12/2012 | Leugemors et al. ....... 166/305.1 |
| 2005/0127208 A1 | 6/2005 | Kaligian et al. |
| 2005/0267001 A1 | 12/2005 | Weaver et al. |

FOREIGN PATENT DOCUMENTS

| | | | |
|---|---|---|---|
| RU | 2256786 C2 | 7/2005 | |
| RU | 2259460 C1 | 8/2005 | |
| SU | 259662 | 12/1969 | |
| WO | WO2004/101704 * | 11/2004 | ............... C09K 7/02 |

OTHER PUBLICATIONS

Examiners Report to Canadian Patent Application Serial No. 2,682,863 dated Feb. 28, 2014 (2 pages).

* cited by examiner

USE OF A CHOPPER MECHANISM TO ADD FIBERS TO A WELL

BACKGROUND

Embodiments described relate to methods for supplying a cut fiber to oilfield application fluids. In particular, embodiments employing chopper mechanisms on-site are described.

BACKGROUND OF THE RELATED ART

The production of hydrocarbons from an oilfield occurs primarily through a wellbore of an underground well. The well may include access to fractures extending radially from the wellbore and into surrounding geologic formations. The presences of such fractures may be beneficial to hydrocarbon production. Indeed, it is not uncommon for a fracturing operation to take place in advance of hydrocarbon production in order to intentionally form fractures extending from the wellbore and into a formation. That is, the well may display an architectural profile having a variety of particularly located fracture sites built thereinto in an effort to maximize hydrocarbon production from the well.

As part of the above-described fracturing operation, a fracturing fluid may be pumped at high pressure into the well in order to form the fractures and stimulate production of the hydrocarbons. That is, the fractures may serve as channels through the formation through which hydrocarbons may reach the wellbore. The indicated fracturing fluid generally includes a solid particulate referred to as propant, often sand. The propant may act to enhance the formation of fractures during the fracturing operation and may also remain primarily within fractures upon their formation. In fact, the fractures may remain open in part due to their propping open by the proppant.

Unfortunately, in certain circumstances, the proppant or other particulate contaminants from the surrounding formation may fail to remain in place. For example, fracturing or other fluid may flow back into the wellbore from the fractures bringing the proppant and other particulates along, a condition referred to herein as "flowback". When this occurs, hydrocarbon production is impeded as opposed to being enhanced. This is a common occurrence in the case of unconsolidated formations as well as those that have undergone gravel packing and other treatments that add particulate to the well.

In order to help avoid the flowback of fracturing fluid and propant or other solid particulate into the wellbore, methods have been developed in which fibers are added to the fracturing fluid in order to provide it with a flowback inhibiting character. These fibers may range from about 10 to about 100 mesh and be of a natural or synthetic glass, ceramic or metal. Regardless, the incorporation of such fibers into the fracturing fluid may substantially prevent the flowback of propant into the wellbore. In fact, the fibers may provide the fracturing fluid with characteristics that inhibit the flowback of fracturing fluid and propant along with any other solid particulate. That is, the fracturing fluid may display a web-like character that acts to trap particulate at a fracture and other sites of the well, thus substantially preventing their flowback.

In addition to the use of fibers in fracturing fluid, flowback inhibiting fibers may be added to cement slurries and other well treatment fluids. That is, flowback inhibiting fibers may be employed in a variety of well treatment fluids determined based on their perceived susceptibility to undesirable particulate and flowback.

Unfortunately, in spite of the broad applicability and effectiveness of flowback inhibiting fibers, they must be added to the requisite treatment fluid at the well site during application of the fluid. For example, flowback inhibiting fibers may not be added to fracturing fluid or combined with propant prior to the employment of the fracturing fluid at the well site. This is due to the fact that the flowback inhibiting fibers provide the noted web-like character to the treatment fluid soon after their addition. Thus, while adept at preventing flowback, the addition of fibers too far in advance of treatment fluid injection will lead to web-like character that will affect the fluidity and workability of the treatment fluid itself and may even clog the borehole.

In order to avoid clogging of the borehole and other similar problems, flowback inhibiting fibers are added to the treatment fluid at the well site during, or immediately prior to, the delivery of the treatment fluid to the well. In this manner, the web-like character of the treatment fluid is fully achieved upon its arrival downhole (e.g. within a fracture) rather than at a random location within the borehole.

Unfortunately, the addition of flowback inhibiting fibers at the well site during operation requires a significant amount of manual labor and is achieved in a manner that is far from precise in terms of metering the addition of the fibers. For example, a conventional fracturing operation may require the addition of between about 150 lbs and about 300 lbs of fiber per minute. Since the fiber may not be pre-mixed with propant or fracturing fluid, it is hand poured from up to 60 lb bags into a mix tub. Given the size and dimensions of conventional mixing equipment, this generally leaves two operators pouring bags of fibers as rapidly as possible during this portion of a fracturing operation.

When all is said and done, each operator may have emptied up to about a ton of fiber into the mixing tub for this portion of a conventional fracturing operation. Furthermore, the volume of fiber added is generally achieved with no more than about a +/−15% degree of accuracy, given the manual nature of the fiber addition. Thus, fiber is often wasted or provided in insufficient quantities to achieve the proper web-like character.

SUMMARY

Embodiments of the present invention include a method of injecting a fluid mixture into a well at an oilfield. The method may include providing a fluid to the oilfield and adding a fiber thereto in order to form the mixture. The adding of the fiber may be achieved with a chopper mechanism whereby the fiber is fed to the chopper mechanism in an uncut form and delivered to the fluid by the chopper mechanism in a cut form.

DETAILED DESCRIPTION

Embodiments are described with reference to certain chopper mechanisms directed at well fracturing and/or cementing applications. However, other types of oilfield applications and fluids may realize benefits afforded by embodiments described herein. For example, drilling applications may employ techniques described herein. Regardless, embodiments described herein employ a chopper mechanism to deliver a cut fiber, from a readily transportable uncut supply thereof, to an oilfield application fluid on-site.

Figure 1:
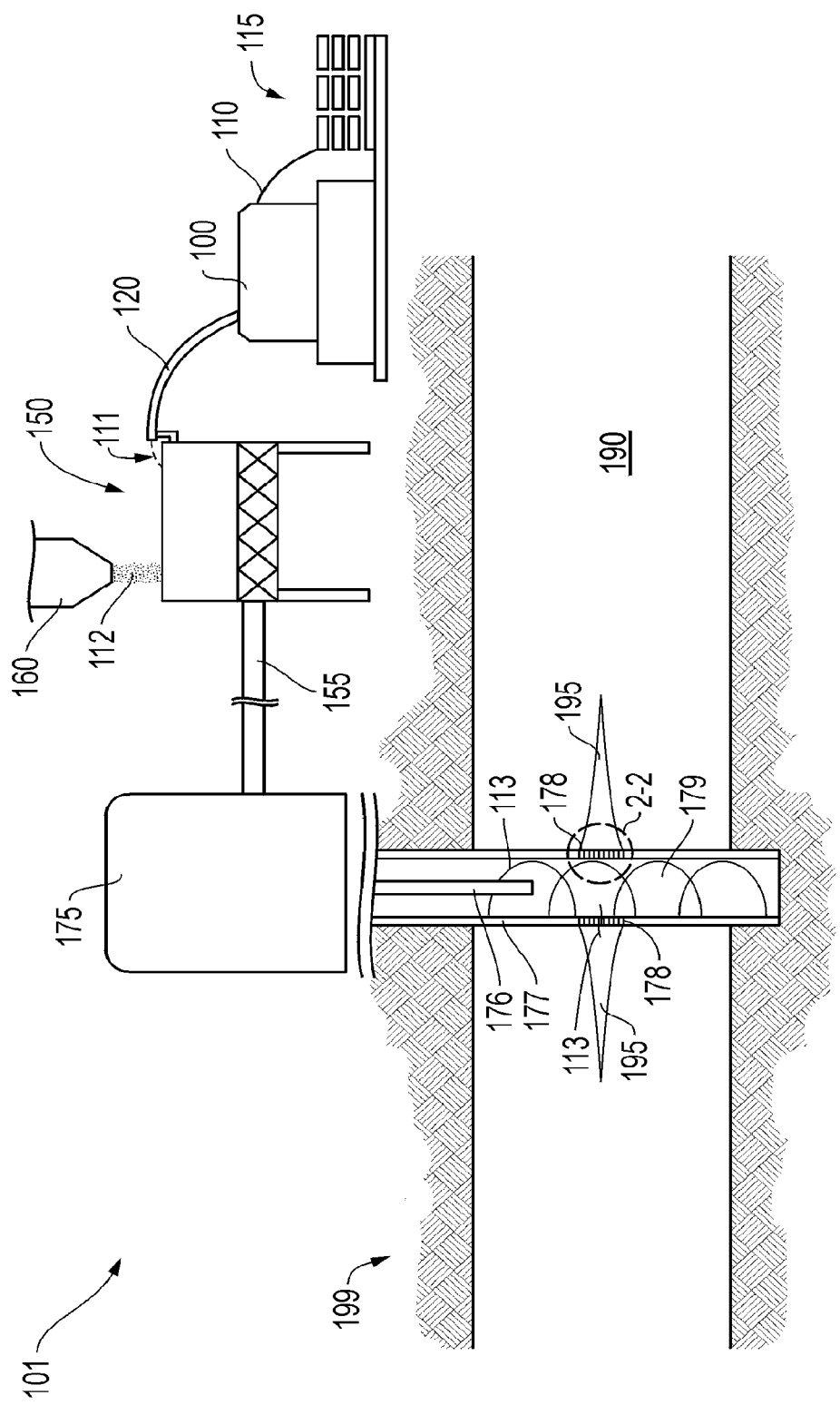
FIG. 1 is a partially cross-sectional overview of an oilfield employing fracturing equipment and a chopper mechanism in the form of a chopper assembly.

Referring now to FIG. 1, an oilfield 101 is depicted where a fracturing operation is carried out. The fracturing operation may be employed to facilitate the production of hydrocarbons from a well 179 through an underground formation 199. In the embodiment shown, a fracturing fluid mixture 113 is delivered to the well 179 under high pressure in order to promote the formation of fractures 195.

The above noted fractures 195 may traverse a production region 190 of the formation 199 in order to target the location of hydrocarbons. As shown, the fracturing fluid mixture 113 is able to penetrate the production region 190 through perforations 178 in the well casing 177. That is, the well 179 may be configured with a casing 177 having perforations 178 at predetermined locations that are aligned with the position of the production region 190. Thus, the highly pressurized fracturing fluid mixture 113 may be forced down the well 179 from a discharge pipe 176 at a high enough pressure to permeate outside of the well 179, through the perforations 178 and into the formation 199 to form the fractures 195. Targeted hydrocarbons, generally oil and natural gas, may thereby be drained from the production region 190 through the fractures 195.

Constituents of the above-described fracturing fluid mixture 113 are provided to the well 179 after combining at a mix tub 150. Once the mixture 113 is attained it may be directed through the well 179 by a series of high pressure pumps. For example a series of conventional large scale triplex pumps (not shown) may be employed together, linked through a common manifold and coupled to the well head 175. The combined output of these pumps may be mechanically collected and distributed according to the parameters of the fracturing operation. The fracturing fluid mixture 113 may thus be driven into the well formation 199 for fracturing rock and forming fractures 195 as described above. In one embodiment, a series of between about 4 and about 20 conventional triplex pumps are provided at the oilfield 101 for such a fracturing operation.

As alluded to above, the fracturing fluid mixture 113 is provided to the high pressure pumps for fracturing from a mix tub 150. That is, a mix tub 150 may be provided whereat constituents 111, 112 are combined to form the fracturing fluid mixture 113 just prior to its high pressure downhole injection as described above. An exit pipe 155 may be employed to carry the mixture 113 from the mix tub 150 to the above noted pumps or other post-mix processing locations at the oilfield 101. Regardless, constituents 111, 112 are combined at the oilfield 101 to form the fracturing fluid mixture 113 at the time of the fracturing operation. As described below, this allows the fracturing fluid mixture 113 to be advanced throughout the fracturing equipment at the oilfield 101 and through the well 179 prior to taking on any sticky gel-like properties or a web-like character that might otherwise impede such advancement.

Continuing with reference to FIG. 1, the mix tub 150 is shown receiving constituents 111, 112 from multiple sources. One such source may include a chopper mechanism, such as the depicted chopper assembly 100 for delivering fiber 111 to the mix tub 150. Additionally, fluid 112, such as a conventional fracturing fluid 112, may be provided to the mix tub 150 through a feeder 160. The fracturing fluid 112 itself may be an abrasive slurry made up of water or other liquid with a proppant such as sand, ceramic material, bauxite, and/or a variety of other abrasive additives blended therein. These components of the fracturing fluid 112 may be blended together prior to delivery at the mix tub 150 as shown in FIG. 1. However, in other embodiments components may be individually provided to the mix tub 150 for mixing thereat.

Regardless of whether the components of the fracturing fluid 112 are pre-mixed or individually fed to the mix tub 150, the fiber 111 is indeed individually provided to the mix tub 150, preferably upon addition of the fracturing fluid 112 or its components thereto. That is, as alluded to above and detailed further below, the fiber 111 may provide a web-like character to the fracturing fluid mixture 113 once assimilated therethrough. A process of congealing may ensue that, within a matter of under a few hours, provides a web-like character to the fracturing fluid mixture 113 that substantially prohibits its free flow of movement through the described oilfield delivery equipment. As also described below, this may be of benefit in avoiding flowback of the fracturing fluid mixture 113 into the well 179 from the production region 190. However, this characteristic of the fiber 111 provides good reason to have the fiber 111 separately added to the fracturing fluid 112 as opposed to providing a pre-mixed, most likely unworkable, fracturing fluid mixture 113 with fiber 111 already blended therein. Fibers 111 capable of forming the above described web like character when added to a fracturing fluid 112 are well known in the art.

Given that the fiber 111 is to be separately or individually added to the mix tub 150 as indicated, a chopper assembly 100 may be provided to draw in uncut fiber 110 from a pallet 115 and distribute the cut fiber 111 through a hose 120 and to the mix tub 150. Although specific embodiments of the chopper assembly 100 are described below, the chopper assembly 100 may be any device appropriate for metering and cutting the uncut fiber 110 to form a cut fiber 111 having a predetermined size range.

For example, in one embodiment the chopper assembly 100 is a roving cartridge cutter modified as detailed herein, to draw in multiple lines of uncut fiber 110 simultaneously. Furthermore, for convenience, the chopper assembly 100 and the fiber supply pallet 115 may be provided atop a platform or skid. In this way, a modular mode of fiber supply and delivery may be provided to the operation at the oilfield 101.

The supply of uncut fiber 110 at the pallet 115 may be made up of cheeses or rolls of the uncut fiber 110. The cheeses may be interconnected and continuous with one another such that as one cheese is unrolled and emptied into the chopper assembly 100, the next may be subsequently and automatically fed thereto without interruption. In the embodiment shown, a single conventional pallet configuration is employed wherein 36 cheeses are available per pallet. However, other configurations of supplying uncut fiber 110 may be employed. For example, a non-pallet supply of uncut fiber 110 may be provided or multiple pallets 115 may be drawn from simultaneously by the chopper assembly 100. In fact, in one embodiment between about 4 and about 10 lines of uncut fiber 110, preferably about 6, are simultaneously fed into the chopper assembly 100. This may help ensure an adequate rate of cut fiber 111 to the mix tub 150 for a given application.

In the embodiment of FIG. 1, a fracturing application is depicted. In such an application the chopper assembly 100 may deliver between about 100 lbs and about 300 lbs. per minute of cut fiber 111 to the mix tub 150. The chopper assembly 100 itself may be configured along the lines of a large or multiple feed stationary chopper gun 400 (see FIG. 4)

with capability of providing such a rate of cut fiber 111 to the mix tub 150. This automated manner of such a delivery of cut fiber 111 saves significant manpower otherwise required to manually dump bags of cut fiber 111 to the mix tub 150. Furthermore, due to the automated nature of the delivery, the chopper assembly 100 may achieve a rate of delivery that is accurate to within at least about 5% of a given delivery protocol.

For a fracturing application such as that described above, the cut fiber 111 may be delivered to the mix tub 150 by the chopper assembly 100 in fragments of between about 10 mesh and about 100 mesh. Additionally, the fiber 111 may be made up of a natural or synthetic glass, ceramic or metal. In fact, fiber 111 of the same type and characteristics may be employed as part of a cement slurry mixture 513 as detailed further below.

Figure 2:
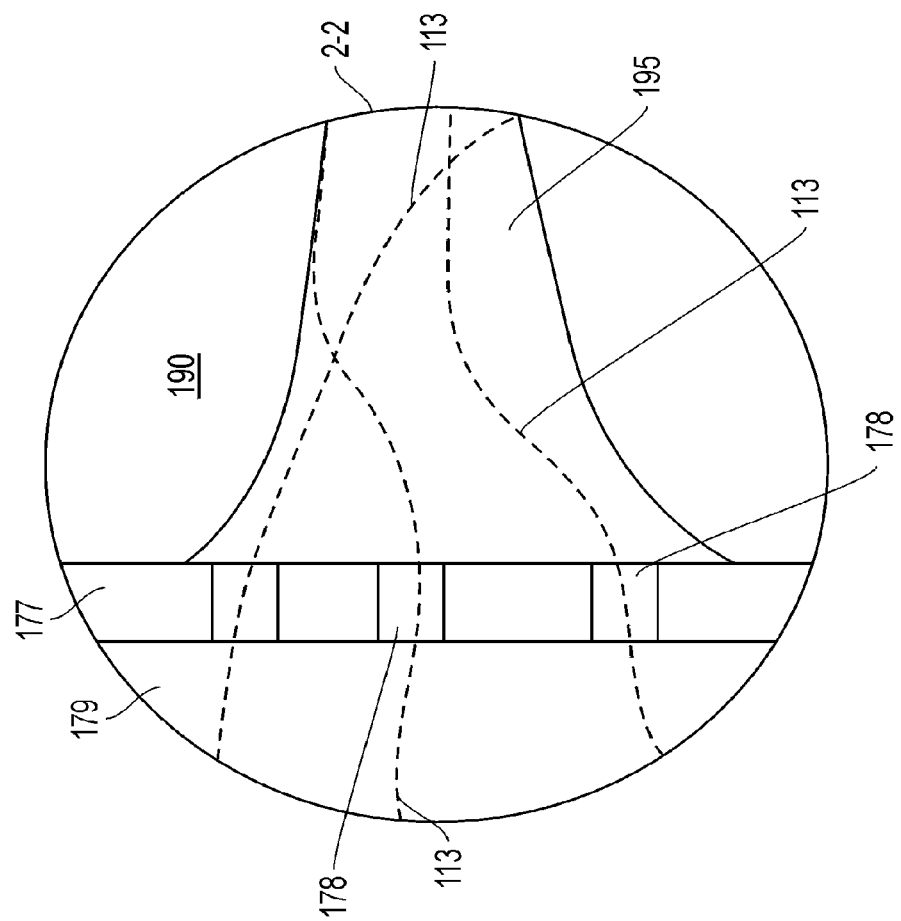
FIG. 2 is an enlarged view of the oilfield taken from section 2-2 of FIG. 1 and revealing a fracturing fluid mixture flowing into a fracture.
Figure 3:
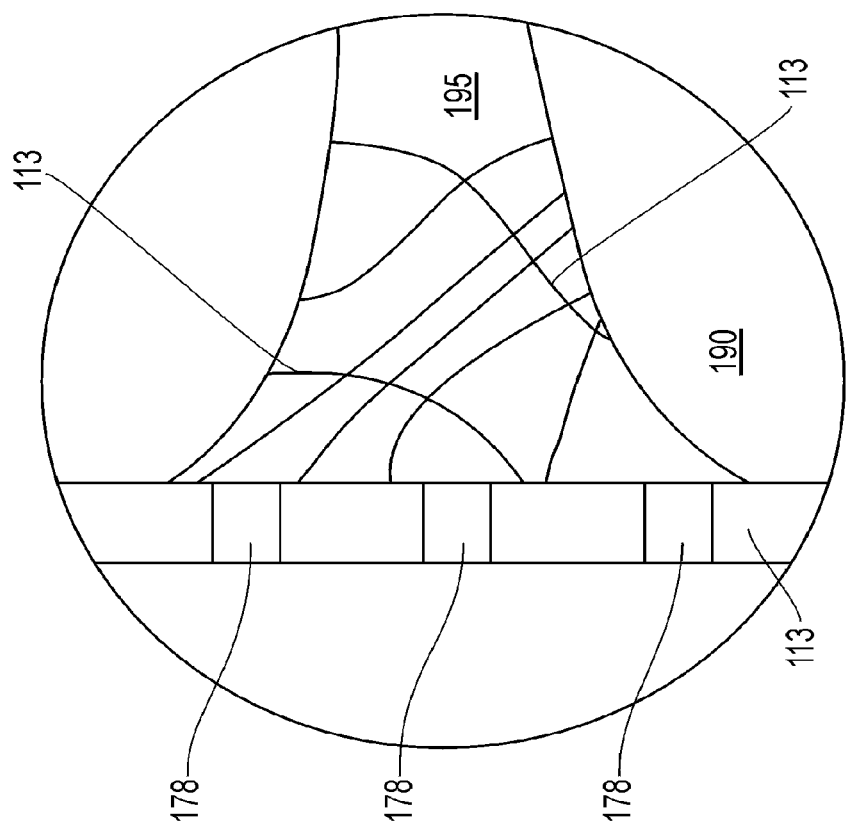
FIG. 3 is the view of FIG. 2 revealing the fracturing fluid mixture taking on a web-like character within the fracture.

Referring now to FIGS. 2 and 3, with added reference to FIG. 1, constituents 111, 112 may be blended by the mix tank 150 as indicated and advanced through the exit pipe 155 for further processing or pressurization. Thus, a blended fracturing fluid mixture 113 may be injected at high pressure into the well 179. With particular reference to FIG. 2, fluid streams of the fracturing fluid mixture 113 are depicted that are able penetrate the well formation 199 through perforations 178 in the well casing 177. The fracturing fluid mixture 113 thus effects and/or promotes the formation of a fracture 195 into the production region 190, thereby allowing targeted hydrocarbons thereat to empty into the well 179.

Continuing with reference to FIG. 3, however, the escape of hydrocarbons from the production region 190 and into the well 179 may not be all that is prone to escape the fracture 195. That is, loose geologic particulate as well as the fracturing fluid mixture 113 and its abrasive components might be susceptible to returning to the well 179. Given that a significant amount of such "flowback" may be damaging to oilfield equipment and production, the fracturing fluid mixture 113 has been fortified with cut fibers 111 that promote the formation of a web-like structure in the mixture 113 within a matter of under a few hours.

In FIG. 3, the web-like character of the mixture 113 is evident in the matrix of material disposed in the fracture 195. The matrix of the congealed mixture 113 exhibits behavior and properties that help to trap any loose particles of the formation, or of the mixture 113 itself, in place. As a result, such particles are unable to re-enter the well 179 through the perforations 178. Thus, the deleterious effects of flowback as described above may be avoided.

Figure 4:
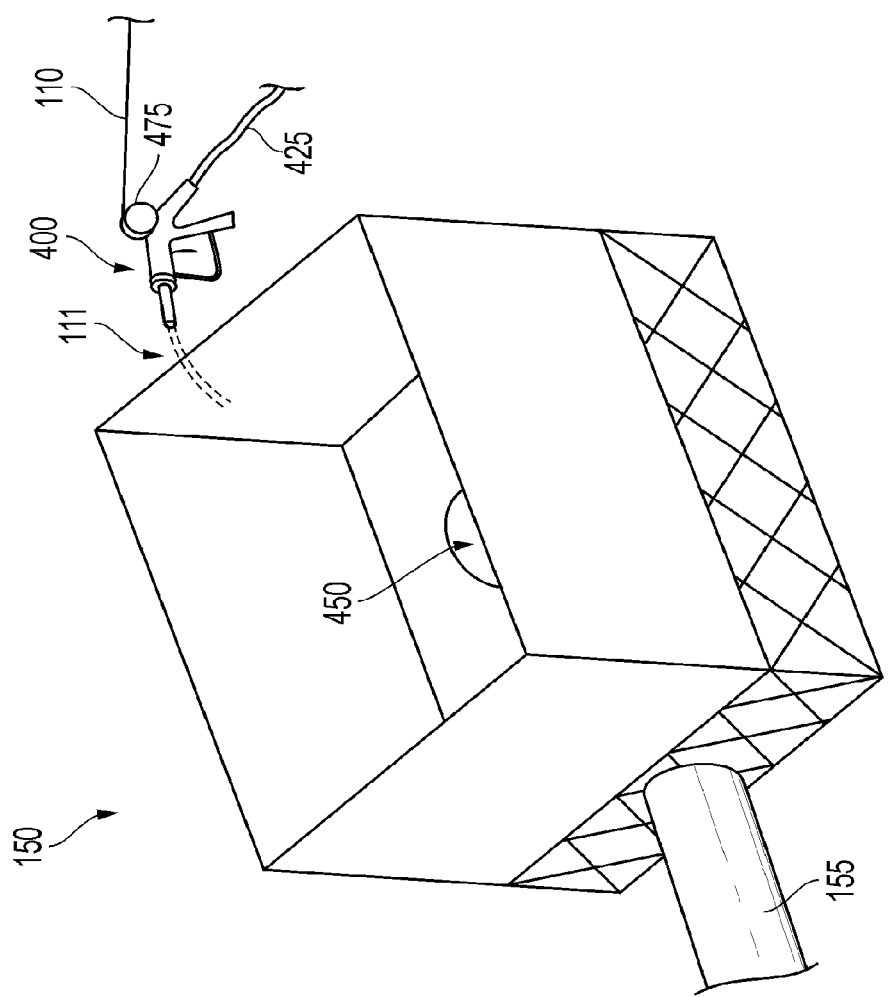
FIG. 4 is a top perspective view of a mix tub at the oilfield of FIG. 1 and a chopper mechanism in the form of a chopper gun.

Continuing now with reference to FIG. 4, the mix tub 150 of FIG. 1 is depicted. The mix tub 150 includes a drain 450 that is coupled to a blending mechanism for mixing of components and constituents of a mixture such as the above described fracturing fluid mixture 113 (see FIGS. 1-3). However, in the embodiment shown, the chopper assembly of FIG. 1 is replaced with a chopper gun 400 from which the cut fibers 111 are supplied to the mix tub 150. As described below, a chopper gun 400 is a handheld tool that may be well suited for lower rate fiber supply applications such as cementing.

Figure 5:
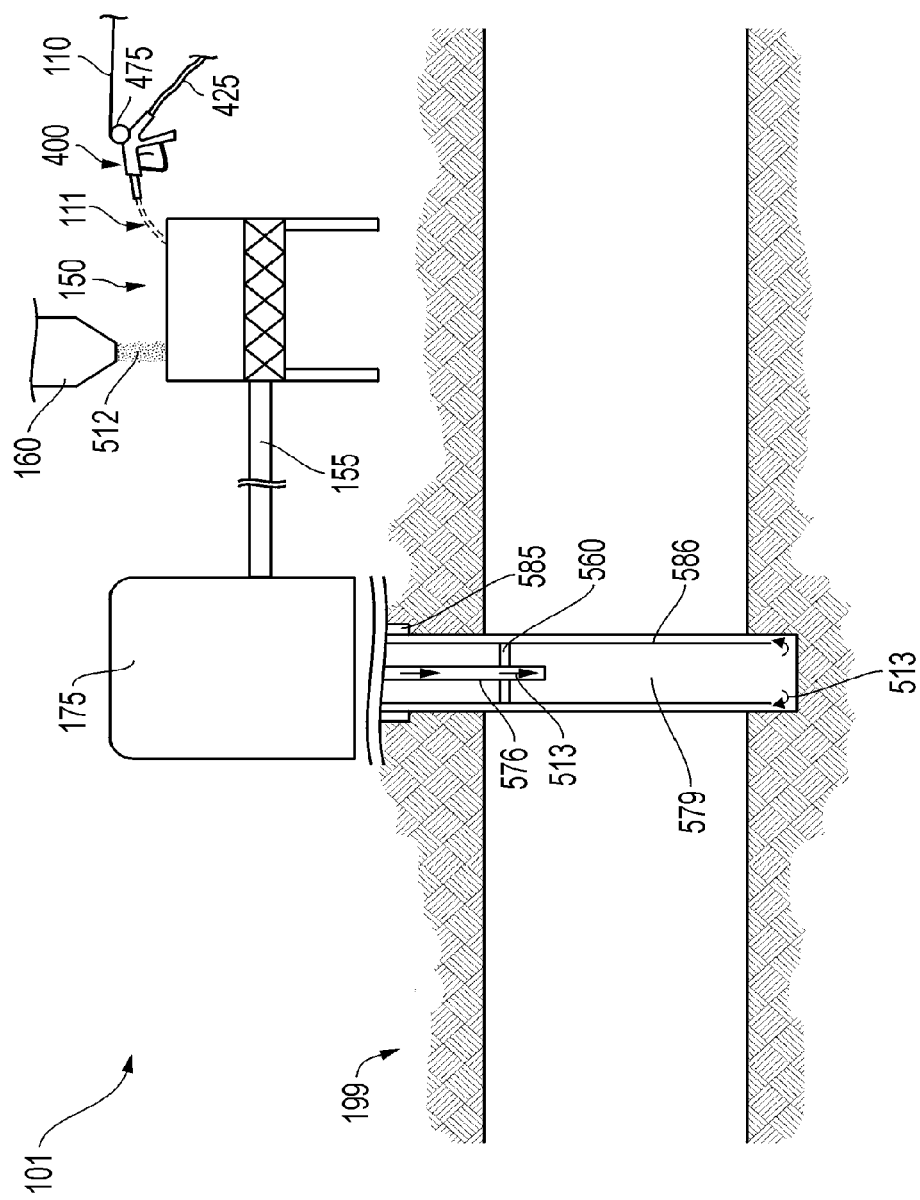
FIG. 5 is a partially cross sectional overview of an oilfield employing cementing equipment and a chopper mechanism in the form of a chopper gun.

Continuing now with reference to FIGS. 4 and 5, a cementing application employing a chopper gun 400 is described. The cementing application may be carried out at the oilfield 101 depicted in FIG. 1 and as part of a completion operation targeting the production of hydrocarbons from a well 579. However, in the embodiment of FIG. 5, focus is drawn to the delivery of a cement slurry mixture 513 to the well 579 as detailed below.

As alluded to above, a cement slurry mixture 513 is delivered to the well 579 in order to secure a borehole casing 586 in place within the formation 199. Cementing in this manner may follow drilling of the well 179 itself whereby a drill bit is rotably driven into the formation to drill the well 179 with the aid of circulating mud. Subsequent cementing may take place wherein a delivery pipe 576 is driven past uphole sections of in place borehole casing 585, through a cement plug 560 and to un-cemented downhole borehole casing 586. A cement slurry mixture 513 is then delivered downhole and forced between the casing 586 and the formation 199 for securing the casing 586 in place. Large scale cement pumps may be employed to deliver the cement slurry mixture 513 as shown.

A cementing application such as that described above may take place in advance of, or in addition to, a fracturing application as also detailed herein. That is, depending on the design of the overall completion operation, fracturing and cementing techniques may both be employed for the purpose of furthering removal of hydrocarbons, again, generally oil and natural gas, from the formation 199.

Continuing with reference to FIGS. 4 and 5, constituents 111, 512 of the cement slurry mixture 513 are initially combined at a mix tub 150, similar to the fracturing operation. Again, due to the nature of the combined mixture 513, the constituents 111, 512 are combined at the oilfield 101 at the time of cementing. Thus, the mixture 513 may be advanced throughout the cementing equipment and through the well 579 prior to taking on properties that substantially impede its advancement therethrough.

Continuing with reference to FIGS. 4 and 5, the mix tub 150 is shown receiving fibers 111 from a chopper gun 400 whereas other constituents 512 are delivered through a feeder 160. These other constituents may include a conventional fluid cement slurry 512. The slurry 512 may be premixed or components thereof individually provided to the mix tub 150 for mixing thereat. Regardless, the fiber 111 is individually provided to the mix tub 150, preferably upon addition of the cement slurry 512 or its components thereto.

As detailed herein, the fiber 111 provides a web-like character to the cement slurry mixture 513. The web-like character may take hold in relatively short order. For example, the flow of mud and other contaminants may be substantially eliminated within a matter of hours, even prior to the complete setting and hardening of the mixture 513 between the casing 586 and the formation 199. This helps prevent undesirable flowback as noted above, safeguarding cementing equipment. However, as in the case of fracturing, the nature of the mixture 513 also calls for the addition of fiber 111 only on site at the time of the operation rather than by way of pre-blending into the slurry 512 off-site.

Given that the fiber 111 is to be separately added to the mix tub 150, a hand held chopper gun 400 may be employed to draw in uncut fiber 110 and distribute cut fiber 111 to the mix tub 150. Unlike a fracturing operation, fiber 111 may be added to the mix tub 150 at a slower rate for cementing, say at between about 5 lbs. and about 20 lbs. per minute. While a chopper assembly 100 as shown in FIG. 1 may be employed to achieve this rate, this slower rate of fiber 111 addition allows for the employment of a user-friendly hands-on option of an air or electric powered chopper gun 400 as shown in FIGS. 4 and 5. In the embodiments shown, the chopper gun 400 is a roving chopper with a power cord 425 that employs a conventional roller 475 to draw uncut fiber 110 theretoward for cutting and distributing as cut fiber 111 to the mix tub 150.

The above described cementing application may employ a supply of uncut fiber 110 from a conventional pallet 115 of cheeses. However, given the lower amount of fiber 111 required for a conventional cementing application, it is unlikely that the majority of such a pallet 115 would be consumed in the application.

The above described use of a chopper gun 400 to deliver cut fiber 111 to the mix tub 150 again saves significant manpower otherwise required to manually dump heavy bags of cut fiber 111 to the mix tub 150. Furthermore, even considering the hand-held nature of the chopper gun 400, its automated nature of cutting and delivery provides for a delivery rate that is accurate to within about 5% of a given delivery protocol for a cementing application while still allowing for direct manual control over the delivery of the fiber 111.

Figure 6:
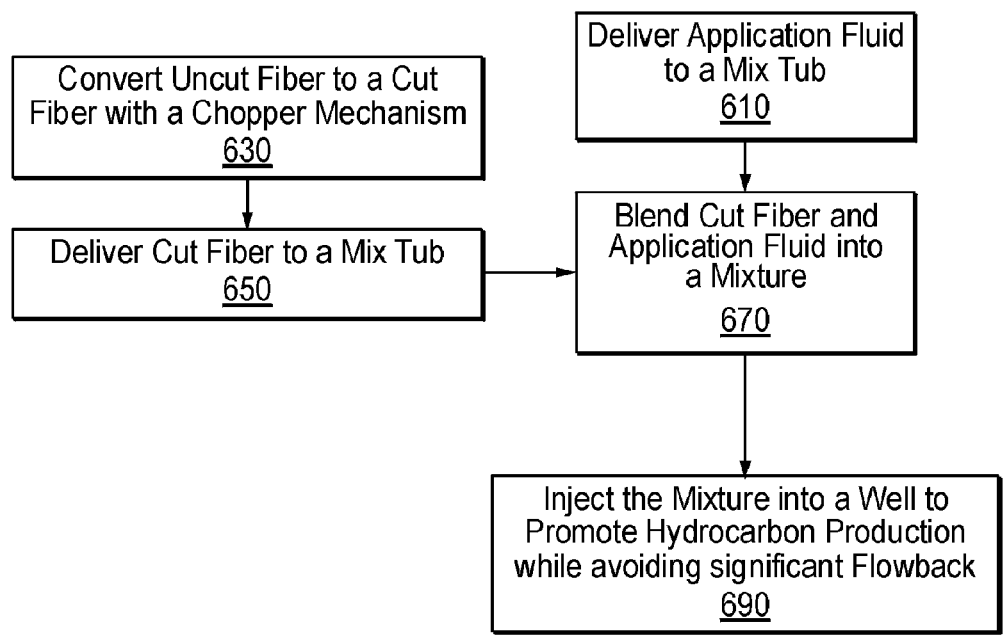
FIG. 6 is a flow chart summarizing an embodiment of employing a chopper mechanism at an oilfield.

Referring now to FIG. 6, an embodiment of employing a chopper mechanism to convert uncut fibers to cut fibers at an oilfield is summarized in the form of a flow chart. With the mix tub 150 and other application equipment in place as shown in FIGS. 1 and 5, an application fluid such as a fracturing fluid 112 or a cement slurry 512 may be delivered thereto as indicated at 610. A chopper mechanism such as a chopper assembly 100 or gun 400 may be employed to convert uncut fibers 110 to cut fibers 111 as indicated at 630. In embodiments described herein the chopper mechanism may simultaneously deliver the cut fibers 111 to the mix tub 150 where they may be blended with the application fluid (see 650, 670). As indicated at 690, the resulting mixture may be employed downhole within a well to promote the production of hydrocarbons therefrom while avoiding significant flowback as a result of properties provided by the cut fibers 111.

The above described embodiments allow for the addition of flowback inhibiting fibers to oilfield fluid mixtures without requiring a significant amount of manual labor. This is achieved by the employment of a chopper mechanism, which, as detailed above, may be employed to drastically reduce the human cost incurred that results from the necessity of on-site fluid mixture blending. Additionally, the use of a chopper mechanism provides a degree of precision in the metering or rate of cut fiber addition to the application fluid mixture heretofore unavailable.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, embodiments described herein include the addition of cut fibers via a chopper mechanism to fracturing fluid or cement slurry in order to form a flowback inhibiting mixture. However, cut fibers may be provided via a chopper mechanism to mud or other oilfield application fluids to similarly avoid problems of flowback during well completion or hydrocarbon production operations. Furthermore, the foregoing description should not be read as pertaining only to the precise structures described and shown in the accompanying drawings, but rather should be read as consistent with and as support for the following claims, which are to have their fullest and fairest scope.

We claim:

1. A method of treating a well at an oilfield with a fluid mixture, the method comprising:
    providing a fluid to the oilfield;
    providing an uncut form of a fiber in the form of an interconnected and continuous plurality of cheeses;
    interconnecting the plurality of cheeses to form a continuous pallet of interconnected cheeses; and
    adding the fiber to the fluid to form the mixture, said adding comprising:
        feeding the uncut form of the fiber to a chopper gun, wherein said feeding is configured to be performed continuously for the duration of the treating;
        operating the chopper gun to convert the uncut form of the fiber to a cut form of the fiber to form a plurality of cut fibers;
        delivering and metering the plurality of cut fibers from the chopper gun to the fluid to provide the mixture with a flowback inhibiting character; and
    injecting the fluid mixture into the well.

2. The method of claim 1, wherein said operating of the chopper gun to convert the uncut form of the fiber to the cut form of the fiber to form a plurality of cut fibers comprises forming a plurality of cut fibers having a predetermined size range.

3. The method of claim 2, wherein the predetermined size range is between about 10 mesh and about 100 mesh.

4. The method of claim 1, wherein the treating of the well is a well fracturing operation, and wherein said delivering of the plurality of cut fibers from the chopper gun to the fluid occurs at a rate of between about 100 and about 300 lbs. per minute.

5. The method of claim 1, wherein the treating of the well is a well cementing operation, and wherein said delivering of the plurality of cut fibers from the chopper gun to the fluid occurs at a rate of between about 5 and about 20 lbs. per minute.

6. The method of claim 1, wherein said providing the fluid comprises providing a fluid that is one of an abrasive slurry for a well fracturing operation, a cement slurry for a well cementing operation, and a mud for well drilling operation.

7. The method of claim 1, wherein said providing the fluid comprises providing a fluid that is an abrasive slurry comprising a liquid and a proppant.

8. The method of claim 1, wherein said providing the fluid comprises providing a fluid that is an abrasive slurry comprising a liquid and a proppant, and wherein the proppant is one of sand, bauxite, and a ceramic.

9. The method of claim 1, wherein the fiber promotes a web-like structure when added to the fluid, and wherein the web-like structure provides the flowback inhibiting character of said fluid mixture.

10. The method of claim 9, wherein the fiber comprises a material that is one of glass, ceramic, and metal.

11. The method of claim 1, wherein the chopper gun is operable to convert the uncut form of the fiber to a variety of predetermined sizes of the cut form of the fiber between about 10 mesh and about 100 mesh.

12. The method of claim 11, wherein the uncut form of the fiber is in the form of a plurality of lines comprising between about 4 and about 10 lines.

13. The method of claim 1, wherein the chopper gun comprises a handheld roving chopper with a roller to accommodate the uncut fiber.

* * * * *